United States Patent
Galtie et al.

(10) Patent No.: US 9,484,811 B2
(45) Date of Patent: Nov. 1, 2016

(54) INTEGRATED CIRCUIT COMPRISING VOLTAGE MODULATION CIRCUITRY AND METHOD THREFOR

(75) Inventors: Franck Galtie, Plaisance du Touch (FR); Philippe Goyhenetche, Fonsorbes (FR); Eric Rolland, Grepiac (FR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/378,239

(22) PCT Filed: Jul. 16, 2009

(86) PCT No.: PCT/IB2009/054208
§ 371 (c)(1),
(2), (4) Date: Dec. 14, 2011

(87) PCT Pub. No.: WO2011/007207
PCT Pub. Date: Jan. 20, 2011

(65) Prior Publication Data
US 2012/0098510 A1  Apr. 26, 2012

(51) Int. Cl.
H02M 3/156  (2006.01)
H02M 7/04  (2006.01)
H02M 3/158  (2006.01)
H02M 3/157  (2006.01)

(52) U.S. Cl.
CPC ............. *H02M 3/156* (2013.01); *H02M 3/157* (2013.01); *H02M 3/158* (2013.01); *H02M 7/04* (2013.01)

(58) Field of Classification Search
CPC .................................................. H02M 3/156
USPC ....... 323/282, 299, 285, 225, 268, 271, 272, 323/222; 363/64, 65, 74, 89
See application file for complete search history.

(56) References Cited

U.S. PATENT DOCUMENTS 4,719,552 A    1/1988  Albach et al.
5,646,513 A    7/1997  Riggio, Jr.
(Continued)

FOREIGN PATENT DOCUMENTS

CN    1918778 A    2/2007
EP    0765108 A    3/1997
(Continued)

OTHER PUBLICATIONS

International Search Report and Written Opinion correlating to PCT/IB2009/054208 dated Feb. 2, 2010.

*Primary Examiner* — Jeffrey Gblende
*Assistant Examiner* — Trinh Dang
(74) *Attorney, Agent, or Firm* — Charlene R. Jacobsen

(57) ABSTRACT

An integrated circuit comprising voltage modulation circuitry arranged to convert an input voltage level at an input node to an output voltage level at an output node. The voltage modulation circuitry comprises a switching element arranged to connect the input node to the output node when in an ON condition, and switching control module operably coupled to the switching element and arranged to control the connection of the input node to the output node by the switching element in accordance with a switching frequency. The voltage modulation circuitry further comprises frequency control module operably coupled to the switching control module and arranged to receive an indication of the input voltage level at the input node, and to configure the switching frequency based at least partly on the input voltage level indication.

15 Claims, 3 Drawing Sheets

(56) References Cited

U.S. PATENT DOCUMENTS

| | | |
|---|---|---|
| 5,982,156 A | 11/1999 | Weimer et al. |
| 6,873,136 B2 | 3/2005 | Chagny |
| 7,034,513 B2 | 4/2006 | Gan et al. |
| 7,212,415 B2 | 5/2007 | Osaka et al. |
| 7,368,897 B2 | 5/2008 | Qahouq |
| 7,471,069 B2 | 12/2008 | Kusafuka et al. |
| 7,884,588 B2* | 2/2011 | Adragna et al. ............ 323/272 |
| 2005/0151571 A1* | 7/2005 | Brown et al. ................ 327/172 |
| 2005/0157522 A1 | 7/2005 | Osaka |
| 2005/0258812 A1 | 11/2005 | Haberstadt |
| 2007/0001655 A1 | 1/2007 | Schiff |
| 2007/0103949 A1* | 5/2007 | Tsuruya ....................... 363/125 |
| 2007/0188958 A1* | 8/2007 | Sase et al. ................... 361/93.1 |
| 2008/0024099 A1* | 1/2008 | Oki et al. ..................... 323/282 |
| 2008/0024104 A1 | 1/2008 | Yamada |
| 2008/0224674 A1* | 9/2008 | Hasegawa .................... 323/271 |
| 2009/0039853 A1 | 2/2009 | Omi et al. |
| 2009/0108824 A1 | 4/2009 | Chen |
| 2009/0153123 A1* | 6/2009 | Kraft ............................ 323/285 |
| 2010/0118571 A1* | 5/2010 | Saint-Pierre ................... 363/89 |
| 2010/0301827 A1* | 12/2010 | Chen et al. .................. 323/299 |

FOREIGN PATENT DOCUMENTS

| | | |
|---|---|---|
| JP | 2001197730 A | 7/2001 |
| WO | 2007/044583 A1 | 4/2007 |

* cited by examiner

INTEGRATED CIRCUIT COMPRISING VOLTAGE MODULATION CIRCUITRY AND METHOD THREFOR

FIELD OF THE INVENTION

The field of this invention relates to an integrated circuit comprising voltage modulation circuitry and a method therefor. More particularly, the field of this invention relates to an integrated circuit comprising voltage modulation circuitry arranged to convert an input voltage level at an input node to an output voltage level at an output node, and a method therefor.

BACKGROUND OF THE INVENTION

The use of DC to DC converters for converting a source of direct current (DC) from one voltage level, for example as supplied by a battery, to a another voltage level, for example as required by a particular electronic circuit, is well known. In particular, switch-mode DC to DC converters are well known that convert one DC voltage level to another by storing energy temporarily, and then releasing the stored energy to the output at a different voltage level. The storage of the energy may be in either magnetic field storage components (e.g. inductors, transformers, etc.) or electric field storage components (e.g. capacitors). Such switch-mode DC to DC conversion is more power efficient than linear voltage regulation, and thus switch-mode DC to DC converters are typically more suitable for use within battery operated devices.

Within the automotive industry, DC to DC converters are used to convert, for example, a first voltage level supplied by the vehicle battery to a second voltage level required by one or more electronic components operating within the vehicle. Such DC to DC converters are required to be able to cope with a wide input voltage range due to variations in the voltage supplied by the battery, as well as transient voltages that may be experienced, for example as a result of a 'load dump'. A load dump may occur, for example, upon the disconnection of the vehicle battery from the alternator while the battery is being charged. As a result of such a disconnection, other loads connected to the alternator (e.g. the DC to DC converter) may experience a power surge resulting in a significantly increased voltage level. Thus, a typical input voltage range that such a DC to DC converter is required to operate across may be, say, between 5 v and 40 v.

The requirements for the next generation of single board computers (SBCs), such as are used within the automotive industry, are currently being defined. In particular, these requirements include several requirements that affect DC to DC converter performance needs when used within the SBCs. Such requirements for the DC to DC converters include: maximum power dissipation; overall efficiency, dynamic response, output voltage ripple, etc.

Known DC to DC converters use various control methods, such as Pulse Frequency Modulation (PFM), Pulse Burst Modulation (PBM), Pulse Width Modulation (PWM), etc. For example, in the case of PWM mode control, a switching frequency for, say, a MOSFET (Metal Oxide Semiconductor Field Effect Transistor) of the DC to DC converter is fixed, whilst the duty cycle is adjusted through a feedback loop. The power dissipation within the switching MOSFET may be expressed as:

(a) Conduction losses, which are primarily dependent upon the 'ON' resistance of the MOSFET, the duty cycle and the load current; and
(b) Switching losses, which are primarily dependent upon the input voltage, switching frequency and the load current.

When such a DC to DC converter experiences a high input voltage, for example as caused by a load dump, the switching power losses increase significantly, requiring the device to be able to dissipate the power lost as, for example, heat. In order to achieve this, the external component of the DC to DC converter must be suitably sized in order to be able to sufficiently dissipate this heat. However, size constraints due to available space, costs, etc, and also the maximum power dissipation and overall efficiency requirements being proposed for the next generation of SBCs, mean that such DC to DC converters are constrained in how they are able to cope with the power losses caused by such high input voltages.

In order to reduce the switching losses during periods of high input voltage, it is necessary to decrease the switching frequency of the DC to DC converter. However, this results in a significant degradation in the dynamic response of the DC to DC converter, and an increase in the output voltage ripple. Such degradation in the dynamic response and increase in the output voltage ripple are not only detrimental to the performance of the DC to DC converter, but also conflict with the ability of the DC to DC converter to comply with the proposed requirements for the next generation of SBCs.

SUMMARY OF THE INVENTION

The present invention provides an integrated circuit comprising voltage modulation circuitry, an electronic system comprising such an integrated circuit and a method therefor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

The invention will now be described, by way of example, in terms of an integrated circuit (IC) comprising a DC to DC converter forming part of an electronic system, such as a single board computer (SBC) device suitable for use within the automotive industry. However, the examples hereinafter described are equally applicable to other electronic systems and devices, and in particular applicable to alternative voltage modulation circuitry arrangements and alternative electronic devices. Furthermore, because the apparatus implementing the present invention is, for the most part, composed of electronic components and circuits known to those skilled in the art, circuit details will not be explained in any greater extent than that considered necessary, as illustrated below, for the understanding and appreciation of the underlying concepts of the present invention and in order not to obfuscate or distract from the teachings of the present invention.

Figure 1:
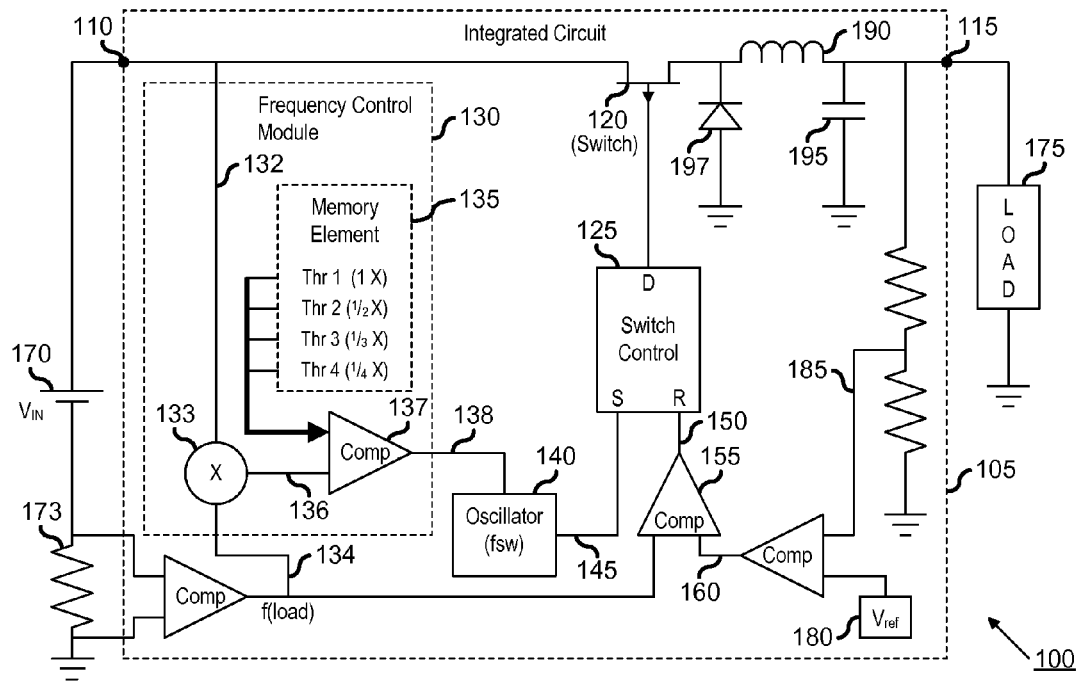
FIG. 1 illustrates an example of an integrated circuit comprising voltage modulation circuitry.

Referring now to FIG. 1, there is illustrated an example of an IC 105 comprising voltage modulation circuitry, generally indicated as 100, arranged to convert an input voltage level at an input node 110 to a different output voltage level at an output node 115. In particular for the illustrated example, the input voltage at the input node 110 is provided by a power source 170 such as a battery, and the output voltage at the output node 115 is supplied to a load 175. The IC 105 may be arranged to form part of an electronic system such as a single board computer (SBC) as illustrated generally at 200 in FIG. 2. For the example illustrated in FIG. 2, the voltage modulation circuitry 100 of the IC 105 is arranged to convert an input voltage level provided by power source 170 at input node 110 to an output voltage level supplied to a load 175 at an output node 115, the load for the example illustrated in FIG. 2 comprising a plurality of system elements illustrated generally at 210.

Referring back to FIG. 1, the voltage modulation circuitry 100 comprises a switching element 120 arranged to connect the input node 110 to the output node when the switching element 120 is in an 'ON' condition, and subsequently release the stored energy when the switching element 120 is in an 'ON' condition. For the illustrated example, the voltage modulation circuitry 100 is based on a buck converter configuration, and in particular comprises a switching element 120 in a form of a MOSFET (Metal Oxide Semiconductor Field Effect Transistor) operably coupled between the input node 110 and the output node 115, and energy storage circuitry operably coupled in series with the switching element 120, between the switching element 120 and the output node 115. For the illustrated example, the energy storage circuitry comprises an inductor 190 operably coupled in series with the switching element 120, and capacitor 195 operably coupled between the output node 115 and ground. A diode 197 is provided between ground and the connection between the switching element 120 and the inductor 190 such that, when the switching element is in an 'OFF' state and energy is stored within inductor 190, the diode 197 becomes forward biased, thereby allowing current to flow through the diode 190. Alternative energy storage components may be provided, for example comprising any suitable combination of one or more of an inductor, a transformer, a capacitor, etc. In this manner, the energy storage components 190, 195 and the diode 197 are able to temporarily store energy from the input node when the switching element 120 is in an 'ON' condition, and subsequently release the stored energy when the switching element 120 is in an 'OFF' condition, resulting in a substantially uninterrupted but lower averaged voltage level at the output node 115 as compared to that at the input node 110. Accordingly, the voltage modulation circuitry 100 is arranged to provide switch mode voltage modulation between the input node 110 and the output node 115. Whilst for the illustrated example, the energy storage components are integrated within the IC 105, in other examples the energy storage components may alternatively, or additionally, be provided external to an IC that comprises the voltage modulation circuitry.

In this example, the voltage modulation circuitry 100 further comprises switching control module 125 operably coupled to the switching element 120 and arranged to control the connection of the input node 110 to the output node 115 by the switching element 120 in accordance with a switching frequency. For the illustrated example, the switching control module 125 is arranged to regulate the connection of the input node 110 to the output node 115 by the switching element 120 in accordance with a switching frequency signal 145 received from oscillator circuitry 140. More particularly, for the illustrated example, the switching control module 125 comprises an SR flip-flop arranged to receive as a 'set' signal the switching frequency signal 145. The switching control module 125 may be arranged to use any suitable control method to regulate the connection of the input node 110 to the output node 115 by the switching element 120, such as Pulse Frequency Modulation (PFM), Pulse Burst Modulation (PBM), Pulse Width Modulation (PWM) etc. For example, in the case of PWM mode control, the switching frequency for the switching element 120 may be substantially regular, whilst a duty cycle for the switching of the switching element 120 may be adjusted through a feedback loop, as described in greater detail below.

The voltage modulation circuitry 100 of FIG. 1 further comprises frequency control module 130 arranged to receive an indication 132 of the input voltage level at the input node 110, and to configure the switching frequency based at least partly on the input voltage level indication provided in path 132. In this manner, the switching frequency in accordance with which the switching control circuitry 125 controls the switching element 120 may be adjusted to take into consideration variations in the input voltage level at the input node 110. In particular, the frequency control module 130 may be arranged to adapt the switching frequency to compensate for transient voltages that may be experienced, for example due to 'load dump' or the like. For example, within the automotive industry, a load dump may occur upon the disconnection of a vehicle battery from an alternator while the battery is being charged. As a result of such a disconnection, other loads connected to the alternator, such as voltage modulation circuitry 100, may experience a power surge resulting in a significantly increased input voltage level.

For the example illustrated in FIG. 1, the frequency control module 130 is further arranged to compare an input reference value 136 based on the input voltage level indication 132 to one or more threshold values in order to determine an appropriate switching frequency value. The frequency control module 130 may then configure the switching frequency in accordance with the determined switching frequency value. Accordingly, for the illustrated example, the frequency control module 130 comprises a memory element 135, for example comprising one or more registers, in which the one or more threshold values may be stored. The frequency control module 130 further comprises comparison module 137 arranged to compare the input reference value 136 to the one or more threshold values stored within memory element 135. In particular for the illustrated example, the comparison module 137 is arranged to output a frequency control signal 138 to the oscillator circuitry 140, whereby the oscillator circuitry 140 is arranged to generate the switching frequency signal 145 in accordance with the received frequency control signal 138.

In this manner, at least a first threshold value may be configured within the memory element 135 such that the input reference value 136 is likely to be less than this first threshold value during normal operating conditions when the input voltage level is within a first voltage range, for example between 0 v and 20 v. Accordingly, upon comparison of the input reference value 136 to this first threshold value by the comparison module 137, if the input reference value 136 is less than this first threshold value, the comparison module 137 may be arranged to cause the oscillator circuitry 140 to generate a switching frequency signal 145 comprising a first switching frequency. Conversely, if the input reference value 136 is greater than this first threshold value, the comparison module 137 may be arranged to cause the oscillator circuitry 140 to generate a switching frequency signal 145 comprising a second, reduced switching frequency.

Thus, when the input voltage level rises above this first voltage range (and therefore threshold) associated with normal operating conditions, for example as a result of a load dump or the like, the switching frequency is reduced. In this manner, the switching losses of the voltage modulation circuitry may be reduced during periods of high input voltage levels, and thus the amount of power needed to be dissipated during such periods, for example as heat, is also reduced. Accordingly, the size requirements for an external component (not shown) of the IC 105 in order to be able to sufficiently dissipate this heat is also reduced as well as supporting a reduction in the maximum power dissipation and overall efficiency to meet the requirements being proposed for the next generation of SBCs. Furthermore, since under such normal operating conditions, when the input voltage level is contained within this first voltage range, the higher switching frequency is configured. As a result, degradation in the dynamic response of the voltage modulation circuitry 100 and an increase in the output voltage ripple therefor, caused by decreasing the switching frequency may be substantially avoided under such normal operating conditions. This improves the performance of the voltage modulation circuitry 100 under such normal operating conditions, and enables the voltage modulation circuitry 100 to comply with the proposed requirements for the next generation of SBCs during such normal operating conditions. Since operating conditions that result in the input voltage level rising above this first voltage range, into what comprises an atypically extended voltage range, may be considered as abnormal, slight degradation in the dynamic response and increase in the output voltage ripple caused by the temporary reduction in the switching frequency during such abnormal operating conditions is typically an acceptable trade off for reducing the switching losses.

In one example, more than one threshold value may be configured within the memory element 135. For example, a second threshold value may be configured within the memory element 135 such that the input reference value 136 is likely to be greater than this second threshold value during excessive operating conditions when the input voltage level is above a different value, for example above 40 v. Accordingly, upon comparison of the input reference value 136 to the first threshold value (discussed above) by the comparison module 137, if the input reference value 136 is determined as being greater than the first threshold value, the comparison module 137 may then compare the input reference value 136 to the second threshold value. If the input reference value 136 is less than the second threshold value, the comparison module 137 may then be arranged to cause the oscillator circuitry 140 to generate a switching frequency signal 145 comprising a second reduced switching frequency. Conversely, if the input reference value 136 is also greater that the second threshold value, the comparison module 137 may be arranged to cause the oscillator circuitry 140 to generate a switching frequency signal 145 comprising a third, further reduced switching frequency. In this manner, a more gradual trade off between (a) power loss and efficiency; and (b) dynamic response and output voltage ripple, may be achieved.

By way of example, the oscillator circuitry 140 may be arranged to generate a default switching frequency ($f_s$). The comparison module 137 may be arranged to provide a modifier value to the oscillator circuitry 140 via the frequency control signal 138 depending on the result of the comparison of the input reference value 136 to the one or more threshold values. Accordingly, when the comparison module 137 is required to cause the oscillator circuitry 140 to generate a switching frequency signal 145 comprising a first switching frequency (say, for use during normal operating conditions), the comparison module 137 may output a modifier value of, say, '1'. The oscillator circuitry 140 may accordingly be arranged to divide the default switching frequency by this value, and output the resulting signal as the switching frequency signal 145. Thus, the first switching frequency in this scenario comprises the default switching frequency ($f_s$).

Conversely, when the comparison module 137 is required to cause the oscillator circuitry 140 to generate a switching frequency signal 145 that comprises a second, reduced switching frequency, the comparison module 137 may output a modifier value of, say, '2'. Accordingly, the oscillator circuitry 140 divides the default switching frequency by this value, and outputs the resulting signal as the switching frequency signal 145. Thus, the second switching frequency in this scenario comprises half the default switching frequency ($f_s/2$). Similarly, when the comparison module 137 is required to cause the oscillator circuitry 140 to generate a switching frequency signal 145 that comprises a third, further reduced switching frequency, the comparison module 137 may output a modifier value of, say, '4'. Accordingly, the oscillator circuitry 140 divides the default switching frequency by this value, and outputs the resulting signal as the switching frequency signal 145. Thus, the third switching frequency in this scenario comprises a quarter of the default switching frequency ($f_s/4$).

Figure 2:
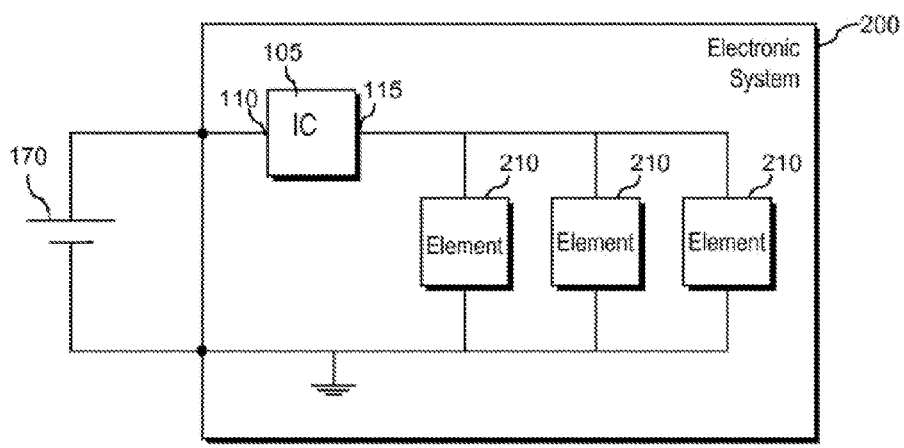
FIG. 2 illustrates an example of an electronic system comprising the integrated circuit of FIG. 1.

In one example, the memory element 135 may be configurable by, for example, a signal processing unit (not shown) or the like within the electronic system 200 of FIG. 2 of which the IC 105 forms a part. In this manner, the threshold values may be configurable by way of application code being executed by said signal processing unit, for example during a boot up sequence, or during system configuration instigated externally via, say, a debug port (not shown) or the like. Furthermore, although the use of one and two threshold values have been described in the above examples, in other examples any suitable number of threshold values may be used, with more threshold values enabling a greater granularity of switching frequencies to be available, thus enabling greater granularity in the trade off between (a) power loss and efficiency; and (b) dynamic response and output voltage ripple.

Referring back to FIG. 1, the frequency control module 130 of the illustrated example is further arranged to receive an indication 134 of a load current, and to combine the input voltage level indication 132 and the load current indication 134 to generate the input reference value 136 such that the input reference value 136 comprises an input power reference value. For the example illustrated in FIG. 1, the load current indication 134 is provided by detecting a potential difference across a resistance 173 within the load current path. Accordingly, for the illustrated example, the frequency control module 130 is arranged to configure the switching frequency based not just on the input voltage level indication 132, but also on the load current indication 134. In particular for the illustrated example, the frequency control module 130 comprises multiplication module 133 arranged to multiply the input voltage level indication 132 and the load current indication 134 together to generate the input reference value 136. In this manner, the input reference value 136 comprises an indication of the input power for the voltage modulation circuitry 100. Thus, for the illustrated example the frequency control module 130 is arranged to configure the switching frequency based on an indication of the input power for the voltage modulation circuitry 100.

The switching control module 125 of the illustrated example is arranged to receive a duty cycle signal 150, and to further regulate the connection of the input node 110 to the output node 115 by the switching element 120 in accordance with the duty cycle signal 150, in addition to the switching frequency signal 145. More particularly for the illustrated example, the switching control module 125, which comprises an SR flip-flop, is arranged to receive as a 'reset' signal the duty cycle signal 150. Thus, for the illustrated example, the switching control module 125 may be arranged to regulate the switching element 120 using pulse width modulation (PWM) mode control, whereby the switching frequency for the switching element 120 may be substantially regular, whilst a duty cycle may be adjusted in accordance with the duty cycle signal 150. For the illustrated example, the duty cycle signal 150 is generated by comparison module 155 based on a comparison between the load current indication 134 and a voltage feedback signal 160, which for the illustrated example is generated based on a difference between an indication 185 of the output voltage level at the output node 115 and a voltage reference signal 180. In this manner, the voltage feedback signal 160, and thereby the duty cycle signal 150 are dynamically dependent on the difference between the output voltage level indication 185 at the output node 115 and the voltage reference signal 180.

In particular for the illustrated example, when the output voltage level indication 185 is less than the voltage reference signal 180 value, thus indicating that the output voltage level at the output node 115 is below a specific voltage level, the resulting voltage feedback signal 160 indicates by how much the output voltage level indication 185 is below the voltage reference signal 180. Assuming this indication of by how much the output voltage level indication 185 is below the voltage reference signal 180 is greater than the load current indication 134, the comparison module 155 generates a duty cycle signal 150 that causes the switching control module 125 to turn the switching element 120 'ON' at the start of the next switching frequency cycle. As a result, upon the switching element 120 being turned 'ON' at the start of the next switching frequency cycle, the output node 115 is connected to the input node 110 (via the energy storage components), thereby causing the voltage level at the output node 115 to increase. When the voltage level at the output node 115 rises above the specific voltage level mentioned above, the output voltage level indication 185 will exceed the value of the voltage reference signal 180. As a result, the voltage feedback signal 160 provides an indication to the comparison module 155 that the output voltage level indication 185 exceeds the voltage reference signal 185 value, and by how much. Assuming this indication is less than the load current indication 134, the comparison module 155 generates a duty cycle signal 150 to cause the switching control module 125 to turn the switching element 120 'OFF'. As a result, upon the switching element being turned 'OFF', the output node 115 is disconnected from the input node 110 such that the current (energy) provided to the output node 115 is supplied by the energy storage components 190, 195, 197, thereby resulting in a gradual decrease in the voltage level at the output node 115, as the energy stored within the energy storage components 190, 195, 197 diminishes.

In this manner, the duty cycle of the voltage modulation circuitry 100 is dynamically adjusted in order to substantially maintain an average voltage level at the output node 115, dependent upon the voltage reference signal 180. Thus, when the frequency control module 130 causes the switching frequency to be changed, for example to compensate for a load dump or the like, the duty cycle is dynamically adjusted to complement the change in the switching frequency, in order to maintain substantially the same average voltage level at the output node 115.

In accordance with some examples, the comparison module 137 may comprise an hysteretic comparator. In this manner, oscillating between switching frequencies caused by the input reference value 136 being close to a threshold value may be substantially avoided.

Figure 3:
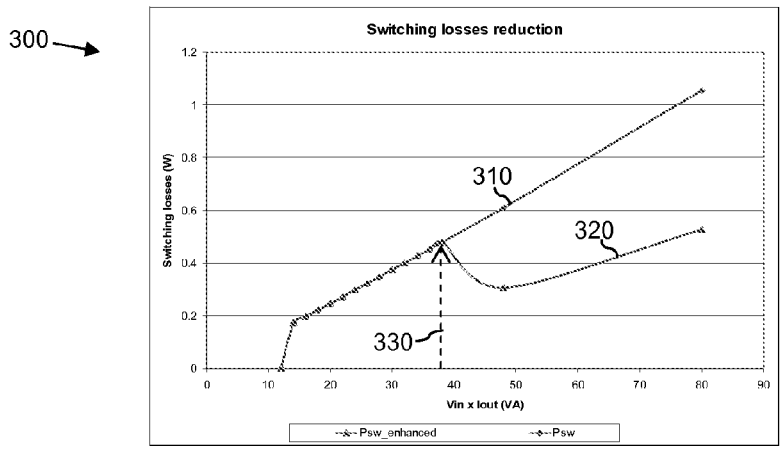
FIG. 3 illustrates a graph showing an example of switching losses.

Referring now to FIG. 3 there is illustrated a graph 300 showing an example of switching losses against input voltage multiplied by load current (Vin*Iload) for a known voltage modulation circuit and for a comparable voltage modulation circuit adapted in accordance with an example of the present invention. In particular, the graph 300 shows a first plot 310 illustrating the switching losses plotted against Vin*Iload for a voltage modulation circuit that is arranged to use conventional pulse width modulation (PWM). The graph 300 further shows a second plot 320 illustrating switching losses Vin*Iload for a voltage modulation circuit adapted in accordance with an example of the present invention, such as the voltage modulation circuit 100 of FIG. 1.

For lower values of Vin*Iload, for example representative of normal operating conditions, the two plots 310, 320 follow substantially the same curve, since the switching frequency and duty cycle for each of the voltage modulation circuits is configured for achieving good dynamic response and output voltage ripple characteristics of the respective voltage modulation circuits under such conditions. As can be seen, as the Vin*Iload value increases so do the switching losses, thereby requiring the external components comprising the respective voltage modulation circuits to dissipate more and more power in the form of heat. As illustrated by plot 310, the switching losses for the voltage modulation circuitry that uses conventional pulse width modulation continue to increase substantially indefinitely as Vin*Iload increases, thereby requiring the external component comprising the conventional voltage modulation circuitry to be sized adequately to cope with such power dissipation requirements.

However, for the voltage modulation circuitry adapted in accordance with an example of the present invention, when Vin*Iload reaches a threshold value, indicated generally by arrow 330, the switching frequency is reduced as described above. As a result, the switching losses also decrease, as illustrated by plot 320. Accordingly, the amount of power required to be dissipated by the external component comprising the voltage modulation circuitry adapted in accordance with examples of the present invention is significantly reduced, thus enabling the sizing thereof to be significantly reduced. Such a reduction may be in the order of 5% as compared with voltage modulation circuits using conventional pulse width modulation.

Figure 4:
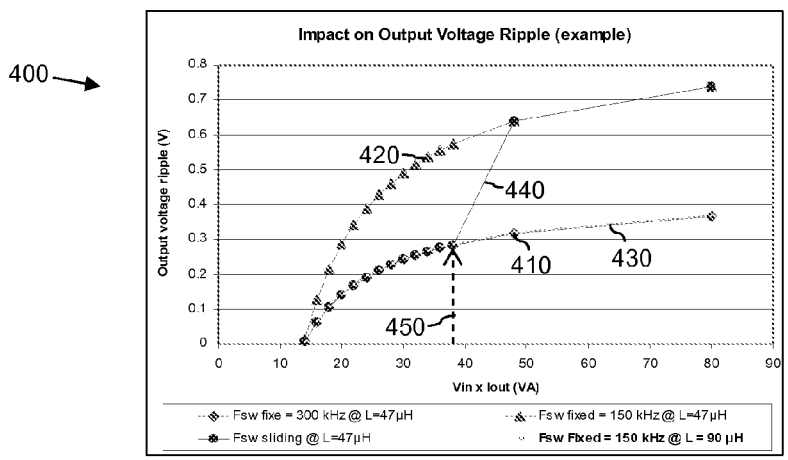
FIG. 4 illustrates a graph showing an example of output voltage ripple.

Referring now to FIG. 4, there is illustrated a graph 400 showing an example of output voltage ripple plotted against input voltage multiplied by load current (Vin*Iload) for known voltage modulation circuits and for a comparable voltage modulation circuit adapted in accordance with an example of the present invention. In particular, the graph 400 shows four plots 410, 420, 430, 440. The first plot 410 illustrates the output voltage ripple against Vin*Iload for a first voltage modulation circuit arranged to use conventional PWM comprising a fixed switching frequency of 300 kHz, and comprising an energy storage component in a form of a 47 μH inductor. The second plot 420 illustrates the output voltage ripple plotted against Vin*Iload for a second voltage modulation circuit arranged to use conventional PWM comprising a fixed switching frequency of 150 kHz, and comprising an energy storage component in a form of a 47 μH inductor. The third plot 430 illustrates the output voltage ripple plotted against Vin*Iload for a third voltage modulation circuit arranged to use conventional PWM comprising a fixed switching frequency of 150 kHz, and comprising an energy storage component in the form of a 90 μH inductor. The fourth plot 440 illustrates the output voltage ripple plotted against Vin*Iload for a fourth voltage modulation circuit adapted in accordance with an example of the present invention, and comprising an adaptable switching frequency, and comprising an energy storage component in the form of a 47 μH inductor.

As illustrated by plot 420, the use of a relatively low switching frequency of 150 kHz with a relatively low value inductor of 47 μH results in an undesirably high output voltage ripple. In order to avoid such a high output voltage ripple using conventional voltage modulation circuits, either the switching voltage may be increased, for example as illustrated at 300 kHz by plot 410, or the inductance value may be increased, for example as illustrated at 90 μH by plot 430.

A problem with increasing the switching frequency is that it increases the switching losses, particularly when high input voltages are experienced, such as due to a load dump or the like. As a result, an increase in the switching frequency requires an increase in the amount of heat dissipation, which in turn requires an increase in the size of the external component for the voltage modulation circuitry. Accordingly, increasing the switching frequency is undesirable.

Figure 5:
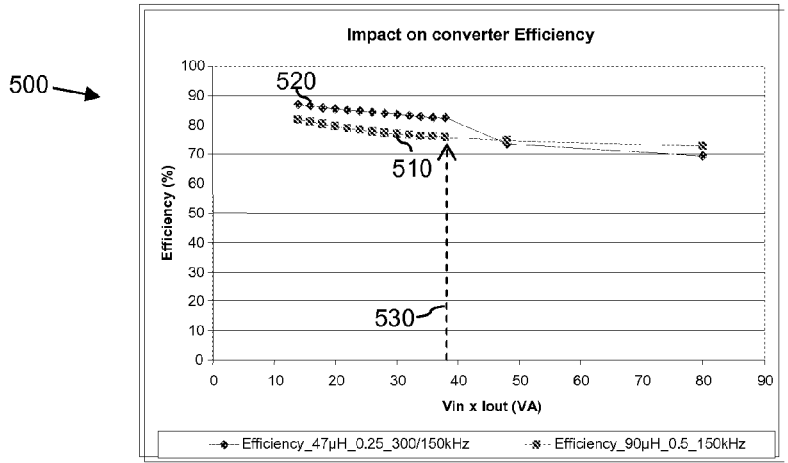
FIG. 5 illustrates a graph showing an example of efficiency.

Whilst increasing the inductance value avoids the need for increasing the switching frequency, the increased inductance significantly reduces the efficiency of the voltage modulation circuitry (as illustrated in FIG. 5 and described in greater detail below).

For the voltage modulation circuitry adapted in accordance with the present invention, represented by plot 440, for lower values of Vin*Iload, the switching frequency may be configured to a relatively high value, for example 300 kHz. In this manner, the output voltage ripple remains sufficiently low for good performance, whilst also allowing an acceptably low inductance value, thereby providing good voltage conversion efficiency. However, when Vin*Iload reaches a threshold value, indicated generally by arrow 450, the switching frequency is reduced, as described above, for example to 150 kHz. In this manner, significant increases in switching losses caused by high input voltages and high switching frequencies may be avoided. Although such a decrease in the switching frequency causes an increase in the output voltage ripple as illustrated by plot 440, because the operating conditions resulting in Vin*Iload rising above the threshold value may typically be abnormal, such temporary degradation in terms of output voltage ripple is generally perceived as an acceptable trade off.

Referring now to FIG. 5, there is illustrated a graph 500 showing an example of efficiency plotted against input voltage multiplied by load current (Vin*Iload) for a known voltage modulation circuit and for a comparable voltage modulation circuit adapted in accordance with an example of the present invention. In particular, the graph 500 shows a first plot 510 illustrating the efficiency plotted against Vin*Iload for a voltage modulation circuit arranged to use conventional PWM comprising a fixed switching frequency 150 kHz, and comprising an energy storage component in a form of a 90 μH inductor. The graph 500 further shows a second plot 520 illustrating the efficiency plotted against Vin*Iload for a voltage modulation circuit adapted in accordance with an example of the present invention, and comprising an adaptable switching frequency, and comprising an energy storage component in the form of a 47 μH inductor.

As previously mentioned with reference to plot 430 of FIG. 4, a problem with a high inductance value of, in this example, 90 μH and the lower switching frequency of, in this example, 150 kHz for the conventional voltage modulation circuit represented by plot 510 is that the high inductance and low switching frequency results in a relatively poor efficiency performance of the voltage modulation circuitry, as illustrated by plot 510. However, for the voltage modulation circuitry adapted in accordance with the present invention, represented by plot 520, for lower values of Vin*Iload, the switching frequency may be configured to a relatively high value, for example 300 kHz. In this manner, the higher switching frequency and lower inductance value results in relatively high efficiency. When Vin*Iload reaches a threshold value, indicated generally by arrow 530, the switching frequency is reduced, as described above, for example to 150 kHz, in order to avoid significant increases in switching losses caused by high input voltages and high switching frequencies. Although such a decrease in the switching frequency causes a decrease in the output efficiency of the voltage modulation circuitry as illustrated by plot 520, because the operating conditions resulting in Vin*Iload rising above the threshold value may typically be abnormal, such temporary degradation in terms of efficiency is generally perceived as an acceptable trade off.

Thus, and as illustrated by the graphs of FIGS 3 to 5, a voltage modulation circuit adapted in accordance with an example of the present invention is able to achieve good performance in terms of efficiency, output voltage ripple and dynamic response for lower input voltage levels, whilst reducing the switching losses resulting from higher input voltage levels, and thereby reducing the amount of power that is required to be dissipated, for example as heat. Furthermore, the voltage modulation circuit adapted in accordance with an example of the invention requires a reduced size of the external component for the voltage modulation circuit.

Figure 6:
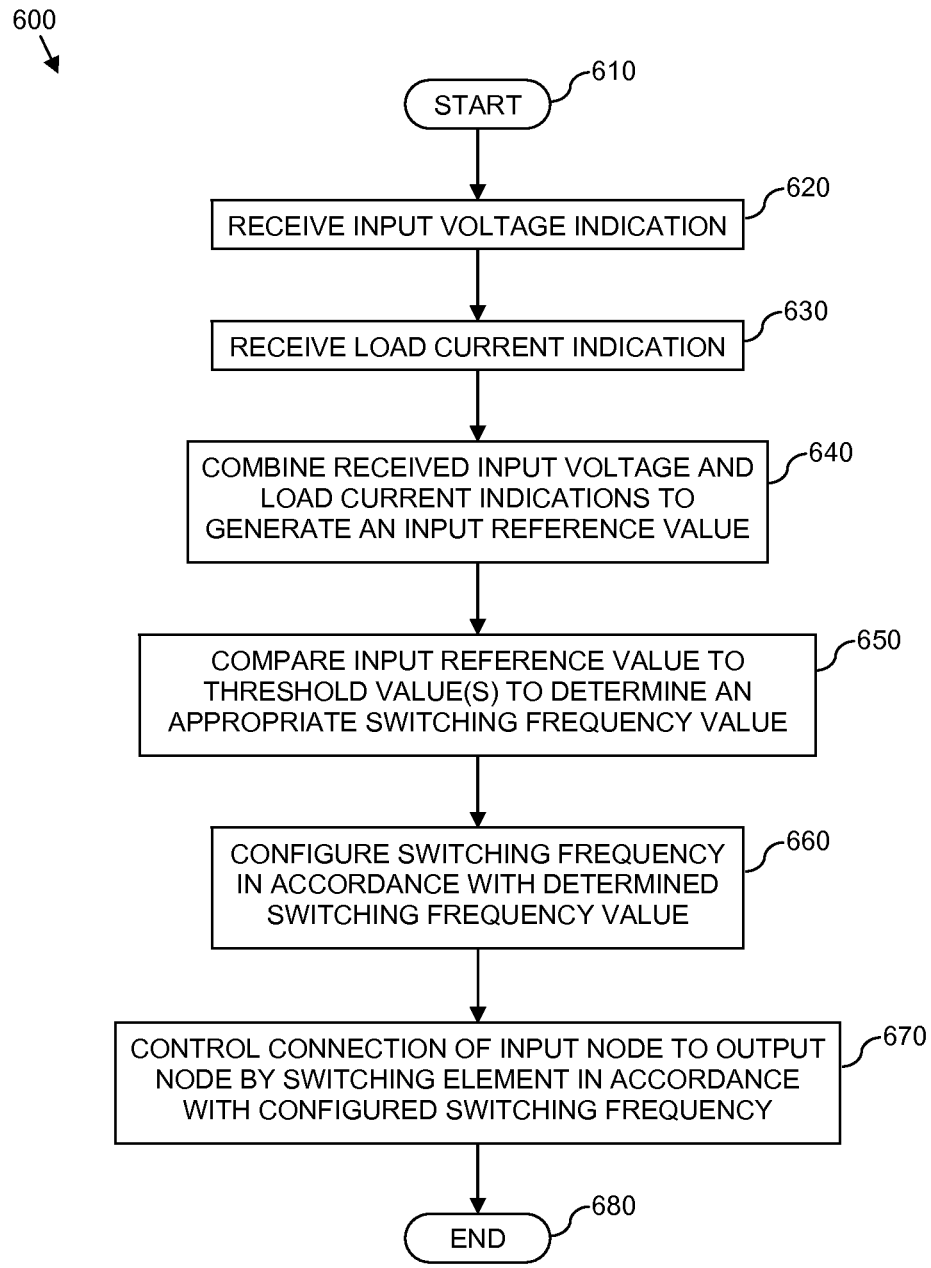
FIG. 6 illustrates a simplified flowchart of an example of a method for converting an input voltage level at an input node to an output voltage level at an output node.

Referring now to FIG. 6, there is illustrated a simplified flowchart 600 of an example of a method for converting an input voltage level at an input node to an output voltage level at an output node, for example as may be implemented by a voltage regulation circuit, such as a DC to DC converter or the like. The method starts at step 610, and moves to step 620 with the receipt of an indication of the input voltage level at the input node 620. For the illustrated example, the method then comprises receiving a load current indication a shown in step 630. Next, in step 640, an input reference value is generated by combining the received input voltage indication and load current indication. The input reference value is then compared with one or more threshold values to determine an appropriate switching frequency value, in step 650. A switching frequency is then configured in accordance with the determined switching frequency value in step 660, and a connection of the input node to the output node is then regulated in accordance with the configured switching frequency in step 670.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention may have been described with respect to specific conductivity types or polarity of potentials, skilled artisans appreciated that conductivity types and polarities of potentials may be reversed.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit comprising:
    a voltage modulation circuitry arranged to convert an input voltage level at an input node to an output voltage level at an output node, the voltage modulation circuitry comprising
        a switching element arranged to connect the input node to the output node when the switching element is in an 'ON' condition,
        a switching control module operably coupled to the switching element and arranged to control a connection of the input node to the output node by the switching element in accordance with a switching frequency, and
        a frequency control module operably coupled to the switching control module and arranged to
            receive a load current indication,
            receive an input voltage level indication of the input voltage level at the input node,
            combine the load current indication and the input voltage level indication to generate an input power reference value,
            determine a first switching frequency value by comparing the input power reference value to a first threshold value,
            configure a first switching frequency for the switching element based on the first switching frequency value,
            determine a second switching frequency value by comparing the input power reference value to a second threshold value,
            configure a second switching frequency for the switching element based on the second switching frequency value, and
            change the switching frequency from the first switching frequency to the second switching frequency based on the input power reference value.

2. The integrated circuit of claim 1, wherein the voltage modulation circuitry further comprises oscillator circuitry arranged to generate a switching frequency signal in accordance with a frequency control signal received from the frequency control module, and to provide the switching frequency signal to the switching control module; and the switching control module is arranged to regulate the connection of the input node to the output node by the switching element in accordance with the switching frequency signal.

3. The integrated circuit of claim 1, wherein the switching control module is further arranged to receive a duty cycle signal; and regulate the connection of the input node to the output node by the switching element in accordance with the duty cycle signal.

4. The integrated circuit of claim 1, wherein the voltage modulation circuitry comprises a buck converter.

5. The integrated circuit of claim 1, wherein the voltage modulation circuitry further comprises at least one energy storage component operably coupled between the switching element and the output node, and the at least one energy storage component comprises at least one element selected from the group consisting of: an inductor, a transformer and a capacitor.

6. The integrated circuit of claim 3, wherein the duty cycle signal is based on a comparison between the load current indication and a voltage feedback signal fed back from the output node.

7. The integrated circuit of claim 6, wherein the voltage feedback signal is generated based on a comparison between an indication of the output voltage level at the output node and a voltage reference signal.

8. A voltage modulation circuitry arranged to convert an input voltage level at an input node to an output voltage level at an output node, the voltage modulation circuitry comprising:

a switching element arranged to connect the input node to the output node when the switching element is in an 'ON' condition;

a switching control module operably coupled to the switching element and arranged to control a connection of the input node to the output node by the switching element in accordance with a switching frequency and a duty cycle; and a frequency control module operably coupled to the switching control module and arranged to receive an indication of the input voltage level at the input node, receive an indication of a load current, combine the input voltage level indication and the load current indication to generate an input power reference value, determine a first switching frequency value by comparing the input power reference value to a first threshold value;

configure a first switching frequency for the switching element based on the first switching frequency value;

determine a second switching frequency value by comparing the input power reference value to a second threshold value;

configure a second switching frequency for the switching element based on the second switching frequency value;

change the switching frequency from the first switching frequency to the second switching frequency based on the input reference value, receive a voltage feedback signal, compare the voltage feedback signal to the load current indication to generate a duty cycle signal, and configure the duty cycle based on the duty cycle signal.

9. The voltage modulation circuitry of claim 8 wherein the first switching frequency value configures the first switching frequency to be one half of a third switching frequency, and the second switching frequency value configures the second switching frequency to be one quarter of the third switching frequency.

10. A method for converting an input voltage level at an input node to an output voltage level at an output node, the method comprising:

receiving an indication of a load current;

receiving an indication of the input voltage level at the input node;

combining the indication of the input voltage level and the indication of the load current to generate an input power reference value determining a first switching frequency value by comparing an input power reference value to a first threshold value;

configuring a first switching frequency for a switching element arranged to connect the input node to the output node when the switching element is in an 'ON' condition based on the first switching frequency value;

regulating a connection of the input node to the output node in accordance with the first switching frequency;

determining a second switching frequency value by comparing the input power reference value to a second threshold value;

configuring a second switching frequency for the switching element based on the second switching frequency value; and regulating the connection in accordance with the second switching frequency.

11. The method of claim 10 further comprising:

receiving a frequency control signal;

generating a switching frequency signal in accord with the frequency control signal; and regulating the connection of the input node to the output node in accord with the switching frequency signal.

12. The method of claim 10 further comprising:

receiving a duty cycle signal; and regulating the connection of the input node to the output node in accord with the duty cycle signal.

13. The method of claim 10 wherein:

the first switching frequency value configures the first switching frequency to be one half of a third switching frequency; and the second switching frequency value configures the second switching frequency to be one quarter of the third switching frequency.

14. The method of claim 12, wherein the duty cycle signal is based on a comparison between the indication of the load current and a voltage feedback signal fed back from the output node.

15. The method of claim 14, wherein the voltage feedback signal is generated based on a comparison between an indication of the output voltage level at the output node and a voltage reference signal.

* * * * *